United States Patent

Thissen

(10) Patent No.: US 7,431,174 B2
(45) Date of Patent: Oct. 7, 2008

(54) FOOD AND BEVERAGE STORAGE AND SERVING VESSEL COMPRISING AN INTEGRAL PHASE CHANGE MATERIAL

(75) Inventor: Rafael K. Thissen, 18695 Wild Horse Creek Rd., Chesterfield, MO (US) 63005

(73) Assignee: Rafael K. Thissen, Chesterfield, MO (US)

( * ) Notice: Subject to any disclaimer, the term of this patent is extended or adjusted under 35 U.S.C. 154(b) by 458 days.

(21) Appl. No.: 10/818,290

(22) Filed: Apr. 5, 2004

(65) Prior Publication Data

US 2005/0218146 A1    Oct. 6, 2005

(51) Int. Cl.
*A47G 23/00* (2006.01)

(52) U.S. Cl. .................................. 220/574.2

(58) Field of Classification Search .............. 220/23.87, 220/23.89, 62.13, 62.22, 506, 573.4, 573.5, 220/574.2, 592.16, 592.17, 592.28, 703, 220/739

See application file for complete search history.

(56) References Cited

U.S. PATENT DOCUMENTS

| | | | |
|---|---|---|---|
| 1,519,034 A | 12/1924 | Livingston | |
| 1,771,186 A | 7/1930 | Mock | |
| 2,526,165 A | 10/1950 | Smith | 62/1 |
| 2,622,415 A | 12/1952 | Landers et al. | 62/142 |
| 2,767,563 A | 10/1956 | Picascia | |
| 3,054,395 A | 9/1962 | Torino | |
| 3,205,678 A * | 9/1965 | Stoner | 62/457.4 |
| 3,302,428 A * | 2/1967 | Paquin et al. | 62/457.4 |
| 3,394,562 A | 7/1968 | Coleman | 62/457 |
| 3,583,596 A * | 6/1971 | Brewer | 220/781 |
| 3,715,895 A | 2/1973 | Devlin | 62/457 |
| 3,755,030 A | 8/1973 | Doman et al. | 156/73 |
| 3,875,370 A | 4/1975 | Williams | |
| 4,789,073 A | 12/1988 | Fine | 215/13.1 |
| 4,981,234 A | 1/1991 | Slaughter | 220/415 |
| 5,209,099 A * | 5/1993 | Saunders | 72/349 |
| 5,253,780 A * | 10/1993 | Adado | 220/711 |
| 5,400,610 A * | 3/1995 | Macedo | 62/130 |
| 5,440,975 A | 8/1995 | Bean | |
| 5,520,103 A | 5/1996 | Zielinski et al. | |
| 5,765,715 A * | 6/1998 | Hughes | 220/737 |
| 5,947,008 A | 9/1999 | Fullmer | |
| 6,305,272 B1 | 10/2001 | Lin | |
| 6,474,499 B2 | 11/2002 | Donelson et al. | |
| 6,494,056 B1 | 12/2002 | Roth et al. | 62/457.3 |
| 6,557,368 B1 * | 5/2003 | DeMars | 62/457.2 |

OTHER PUBLICATIONS

"Serving Accessories", Chillzanne® Collection, p. 9.
"Make Work Easier", Food Bars & Accessories, pp. 69-74.
"Carlisle FoodService Products" instruction sheet for Coldmaster® product and photograph thereof.

* cited by examiner

*Primary Examiner*—Anthony D Stashick
*Assistant Examiner*—Harry A Grosso

(57) ABSTRACT

A food and beverage storage and serving vessel includes an inner container, an outer container, and a removable lid. The outer container has a hollow chamber that extends through a bottom wall and a side wall of the outer container. The chamber is filled with a phase change material that stays cold for an extended period of time when chilled, or stays hot for an extended period of time when heated. The inner container is removably assembled into the outer container, where surface contact between the inner container and outer container transfers the cold/heat of the phase change material to a food or beverage contained in the inner container.

21 Claims, 6 Drawing Sheets

FOOD AND BEVERAGE STORAGE AND SERVING VESSEL COMPRISING AN INTEGRAL PHASE CHANGE MATERIAL

BACKGROUND OF THE INVENTION (1) Field of the Invention

The present invention pertains to a food and beverage storage and serving vessel that is comprised of an inner container and an outer container that are removably attached to each other, and a removable lid that closes over a top opening of the vessel. More specifically, the vessel comprises an inner container, an outer container, and a removable lid, where the outer container has a hollow interior chamber that extends through a bottom wall and a side wall of the outer container. The chamber is filled with a phase change material that stays cold for an extended period of time when chilled, or stays hot for an extended period of time when heated. The inner container is removably assembled into the outer container, where surface contact between the inner container and outer container transfers the cold/heat of the phase change material to a food or beverage contained in the inner container.

(2) Description of the Related Art

There are a variety of different types of food and beverage storage and serving containers that are designed to maintain a food or beverage contained in the containers at or near their initially chilled or heated temperatures. A basic vessel of this type is a thick-walled bowl or a pot, where the wall thickness functions as an insulator for the food or beverage contained in the bowl or pot. Providing a lid to cover over the top opening of the bowl or pot further serves to maintain the food or beverage put into the bowl or pot at its desired temperature.

Food and beverage storage and serving vessels have been designed that include a source of cooling or heating for the food or beverage contained in the vessel. Vessels of this type typically include a source of cooling or heating at the bottom of the vessel. A common example of this type of vessel is a serving dish or pan that rests on a hot plate. This type of vessel is disclosed in the Torino, U.S. Pat. No. 3,054,395, and the Williams, U.S. Pat. No. 3,875,370. However, these vessels are disadvantaged in that the source of cooling or heating only directly affects the food or beverage at the bottom of the vessel that is adjacent the source of cooling or heating.

Prior art food and beverage storage and serving vessels that included their own source of cooling or heating are frequently employed by the food service industry. These vessels are often found at a salad bar or a buffet line where they maintain the cool temperature or hot temperature of the food or beverage contained in the vessel. In these illustrative environments, it is often necessary to remove the vessel from the salad bar or buffet line when it is emptied, replacing the emptied vessel with a second vessel containing the food or beverage being served. Often removing a serving vessel that has a source of cooling or heating attached is awkward and difficult. Replacing the emptied vessel also requires that the food service have a number of the vessels having an attached cooling or heating source in order to keep the salad bar or buffet stocked with the food or beverage. The need to inventory the additional number of these specialized vessels increases the cost of doing business for the food service.

SUMMARY OF THE INVENTION

The food and beverage storage and serving vessel of the invention overcomes the shortcomings associated with prior art vessels having their own source of cooling or heating, by providing a vessel that has a source of cooling or heating in the vessel bottom wall and side wall, thereby providing cooling or heating to a greater amount of the food or beverage contained in the vessel than was provided by prior art vessels.

In addition, the vessel of the invention has a removable inner container that can be removed from an outer container for easy cleaning and restocking of the inner container. The source of cooling or heating is provided in the bottom wall and side wall of the outer container. Several different inner containers could be provided for use with a single outer container. Thus, the food and beverage storage and serving vessel of the invention provides an economical way to provide cooling or heating to food and beverages by a food service, without the requirement of the food service purchasing a large number of specialized vessels with their own cooling or heating source.

The inner container is formed from a single piece of material in a bowl shaped configuration. The configuration gives the one piece inner container a bottom wall and a side wall. The side wall extends around the bottom wall and upwardly from the bottom wall to a top edge of the inner container.

The outer container is formed of an inner layer of material and an outer layer of material, both having a bowl shaped configuration. Both the inner layer and outer layer have a bottom wall. The inner layer and outer layer have a side wall that extends around the layer bottom wall, and extends upwardly from the bottom wall to a top edge of the layer. The inner layer is assembled inside the outer layer, with the top edges of the two layers being secured to each other adjacent the top edge of the outer container. The configurations of the inner layer and outer layer define a hollow chamber inside the outer container bottom wall and side wall.

The hollow chamber in the outer container bottom wall and side wall is continuous. The chamber extends through the bottom wall and upwardly through the side wall to adjacent the top edge of the outer container side wall.

A phase change material is contained inside the hollow chamber. In the preferred embodiment, the phase change material is a gel that substantially fills the chamber in the bottom wall and the side wall of the outer container.

The configurations of the inner container and the interior layer of the outer container enable the inner container to engage in surface contact with the outer container interior layer when the inner container is nested in the outer container. The surface contact provides good heat transfer from the phase change material contained in the hollow chamber of the outer container, through the outer container interior layer and to the inner container nested in the outer container.

A locking mechanism is provided between the inner container and the outer container whereby the inner container can be removably secured in surface contact with the outer container.

A lid constructed of a resilient material is removably attached to the vessel. The lid has a resilient ring at the lid periphery that is dimensioned to resiliently fit over the top edge of the inner container, thereby removably attaching the lid to the vessel. The lid is provided with a hinge that extends across the lid. The hinge enables a portion of the lid to be separated from the top edge of the vessel inner container, with the portion of the lid pivoting about the hinge line to selectively open and close the top opening of the vessel.

BRIEF DESCRIPTION OF THE DRAWINGS

Further features of the invention are set forth in the following detailed description of the preferred embodiment of the invention and in the drawing figures wherein.

DETAILED DESCRIPTION OF THE PREFERRED EMBODIMENT

Figure 1:
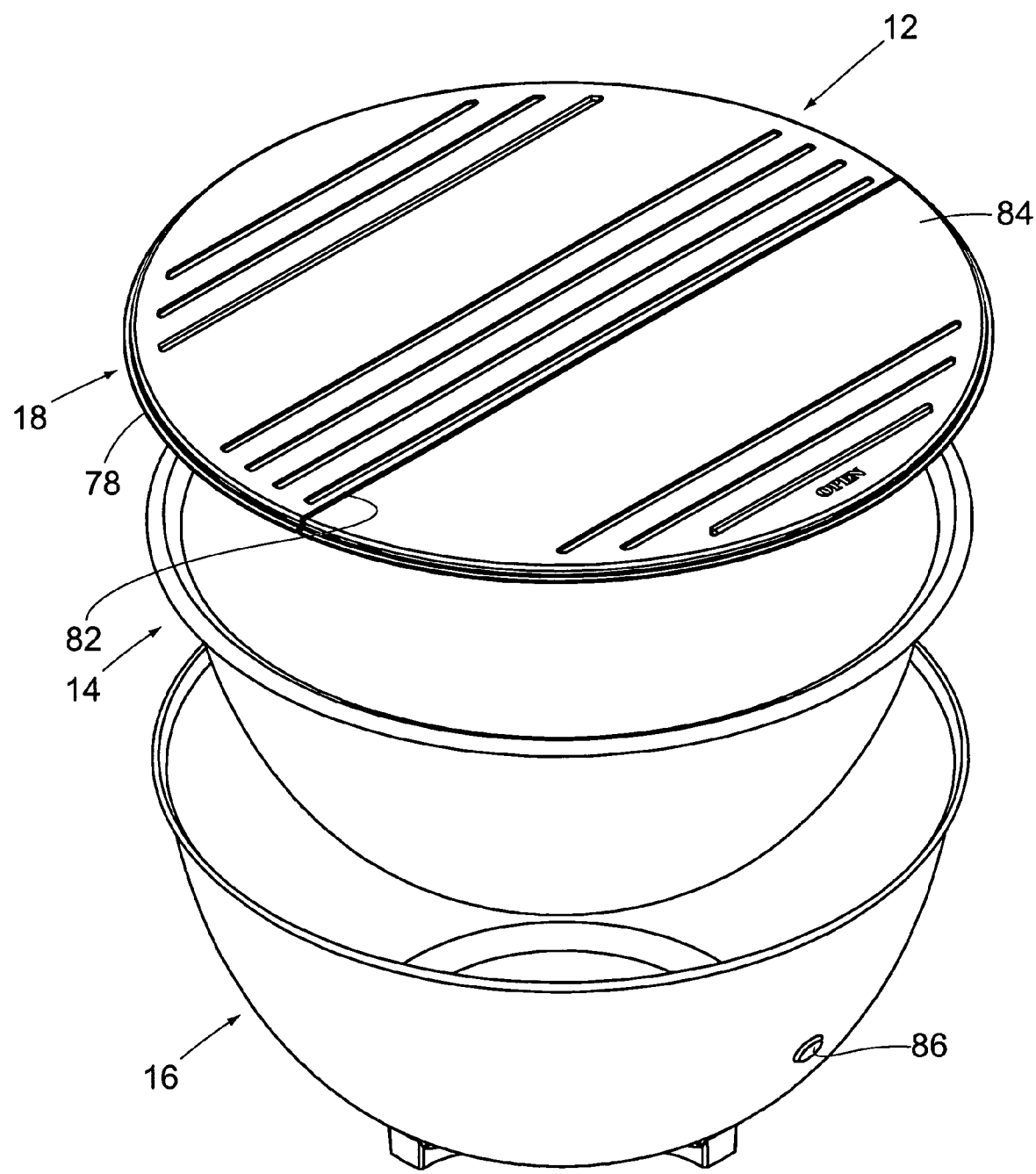
FIG. 1 is a view of the component parts of the food and beverage storage and serving vessel of the invention.

As stated earlier, the food and beverage storage and serving vessel 12 of the invention overcomes the shortcomings associated with prior art vessels having their own source of cooling or heating, by providing a vessel that has a source of cooling or heating in a bottom wall and side wall of the vessel, thereby providing cooling or heating to a greater amount of the food or beverage contained in the vessel. As shown in FIG. 1, the food and beverage storage and serving vessel 12 of the invention is basically comprised of an inner container 14, an outer container 16, and a lid 18.

Figure 2:
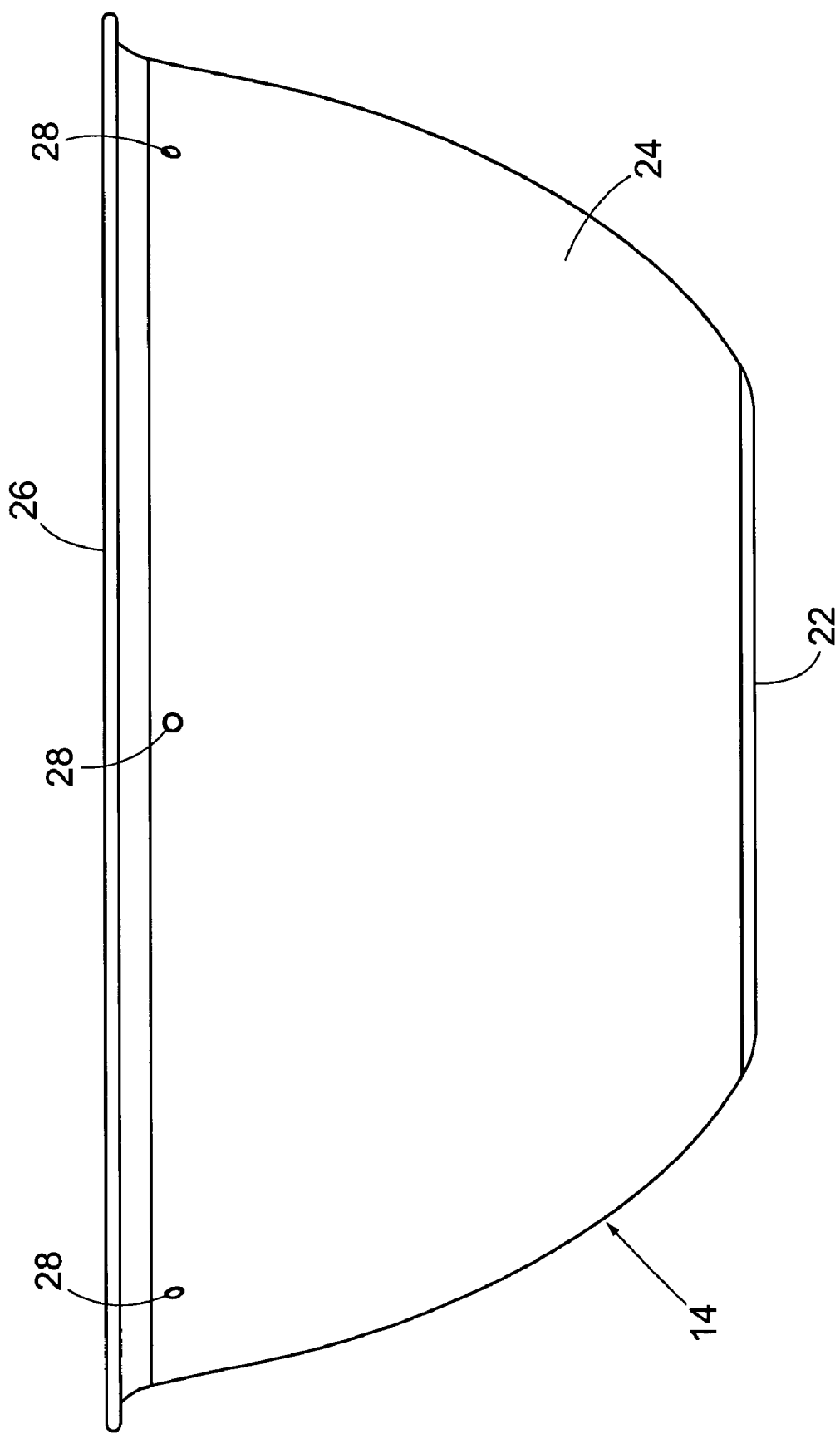
FIG. 2 is a side elevation view of the inner container of the vessel, removed from the other component parts shown in FIG. 1.
Figure 6:
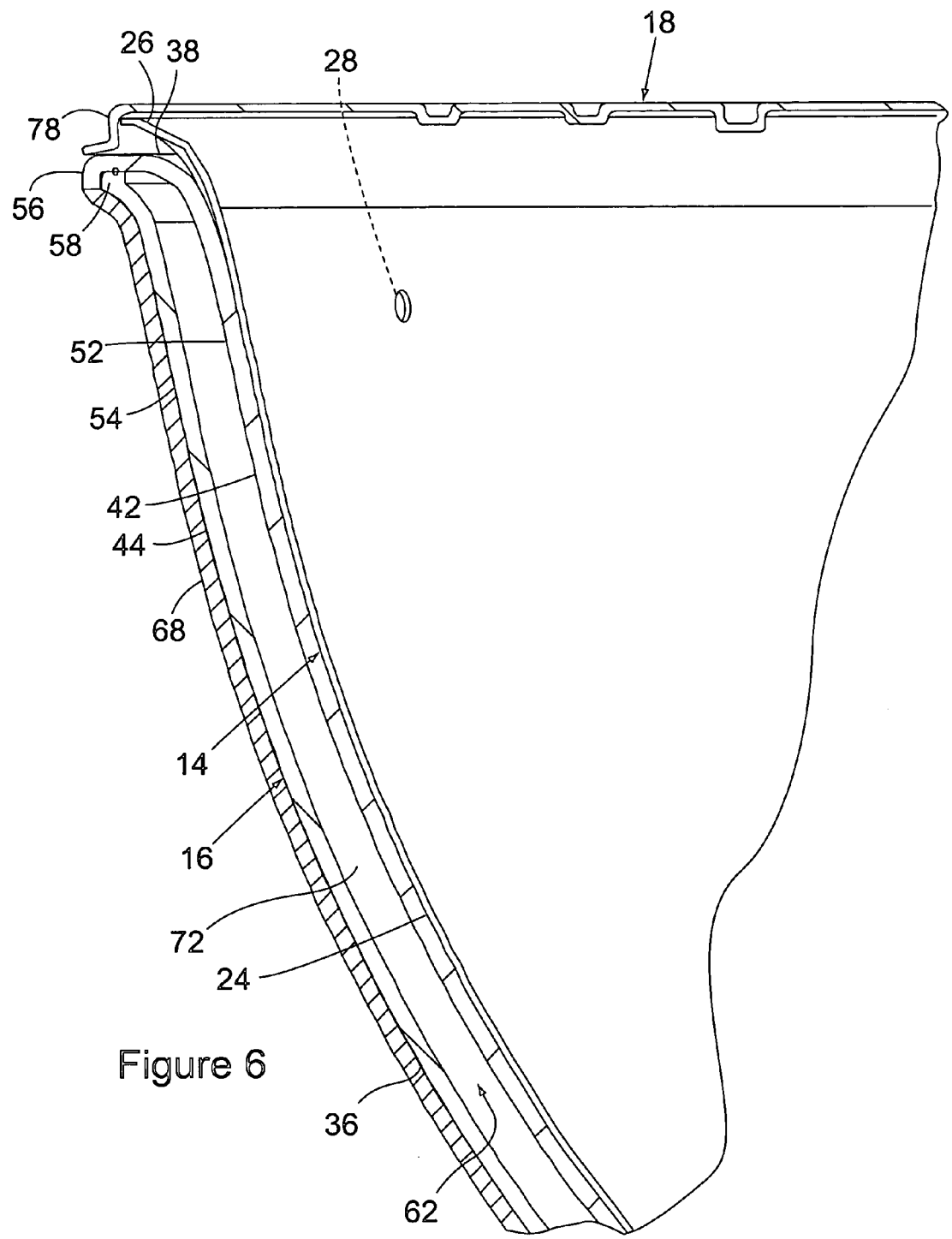

The inner container 14 is shown removed from the other component parts of the vessel in FIG. 2. In the illustrative embodiment shown in FIG. 2, the inner container 14 is formed as a bowl. It should be understood that the inner container 14 could have other configurations, for example a pan or a dish having a circular or a rectangular shape. The inner container 14 has a circular bottom wall 22 and a semi-spherical side wall 24. The side wall 24 surrounds the bottom wall 22 and extends upwardly from the bottom wall to a top peripheral edge 26 of the inner container. In the preferred embodiment of the invention, the inner container 14 is formed from a single piece of metal, for example stainless steel. The top edge 26 of the inner container is rolled outwardly and downwardly beneath itself as shown in the detail of FIG. 6. This reinforces the inner container top edge 26 and also provides the container with a rounded top edge 26 that is comfortable to hold. The rounded top edge 26 also facilitates the removable attachment of the lid 18 to be explained.

The inner container 14 is also formed with a plurality of projections 28. The projections 28 are spatially arranged around the inner container 14 adjacent the container top edge 26. The projections 28 project a short distance outwardly from the exterior of the inner container 14.

Although the use of a single piece of stainless steel in the construction of the inner container 14 is preferred, the inner container could also be constructed of other materials such as ceramic, glass or plastic. Furthermore, a plurality of inner containers 14 could be provided for use with a single outer container 16. In such an assembly of inner containers 14 and an outer container 16, each of the inner containers 14 would be of the same size and have the same configuration.

Figure 3:
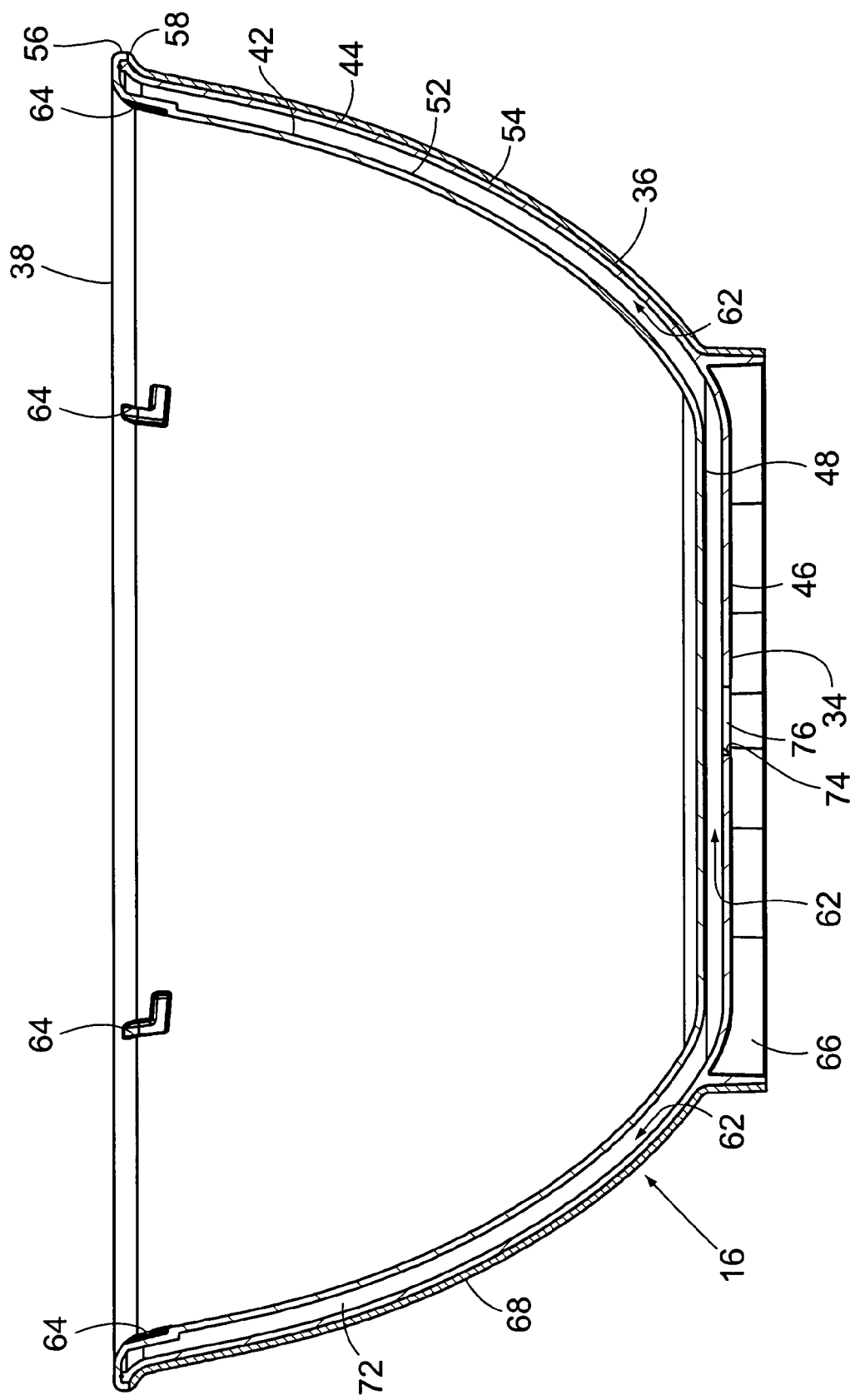
FIG. 3 is a cross sectioned elevation view of the outer container of the vessel, removed from the other component parts shown in FIG. 1.

FIG. 3 shows a cross section of the outer container 16 removed from the component parts of the vessel 12 shown in FIG. 1. The outer container 16, like the inner container 14, is shown in FIG. 3 in a bowl configuration for illustrative purposes only. The outer container 16 could also be formed in some other configuration, for example as a pan or dish. In all embodiments, the outer container 16 will have a configuration that closely follows the configuration of the inner container 14.

The example of the outer container 16 shown in FIG. 3 has a circular bottom wall 34 and a semi-spherical side wall 36. The side wall 36 extends around the bottom wall 34 and extends upwardly from the bottom wall to a top peripheral edge 38 of the outer container 16.

The configuration of the outer container 16 is formed by an interior layer of material 42 and an exterior layer of material 44. In the preferred embodiment, the two layers 42, 44 are constructed of a plastic material, although other materials may also be employed. Both the interior layer 42 and exterior layer 44 have respective, circular bottom walls 46, 48. The interior layer 42 and exterior layer 44 also have respective side walls 52, 54 that are integral extensions of their bottom walls 46, 48. The interior layer and exterior layer side walls 52, 54 surround the respective interior layer and exterior layer bottom walls 46, 48 and extend upwardly from the bottom walls to respective top edges 56, 58 of the interior layer side wall and the exterior layer side wall.

The interior layer top edge 56 is secured to the exterior layer top edge 58. The configurations of the interior layer 42 and exterior layer 44 define a sealed hollow chamber 62 that extends through the outer container bottom wall 34 and the outer container side wall 36. The configurations of the outer container interior layer 42 and exterior layer 44 suspends the interior layer 42 above the exterior layer 44 as shown in FIG. 3. Thus, the hollow chamber 62 is continuous through the outer container bottom wall 34 and the outer container side wall 36.

Figure 4:
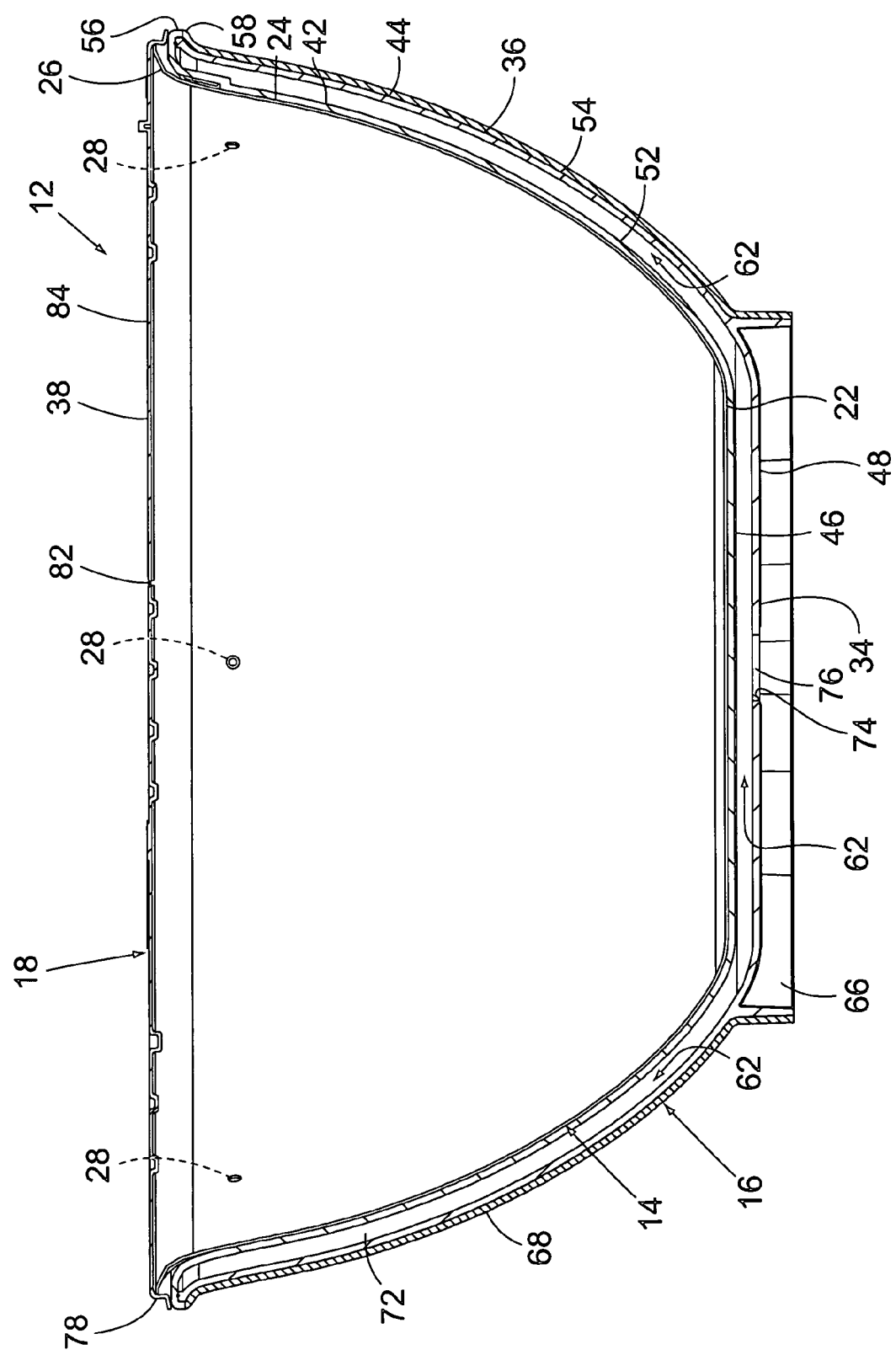
FIG. 4 is a cross sectioned elevation view of the assembled component parts of the vessel.
Figure 5:
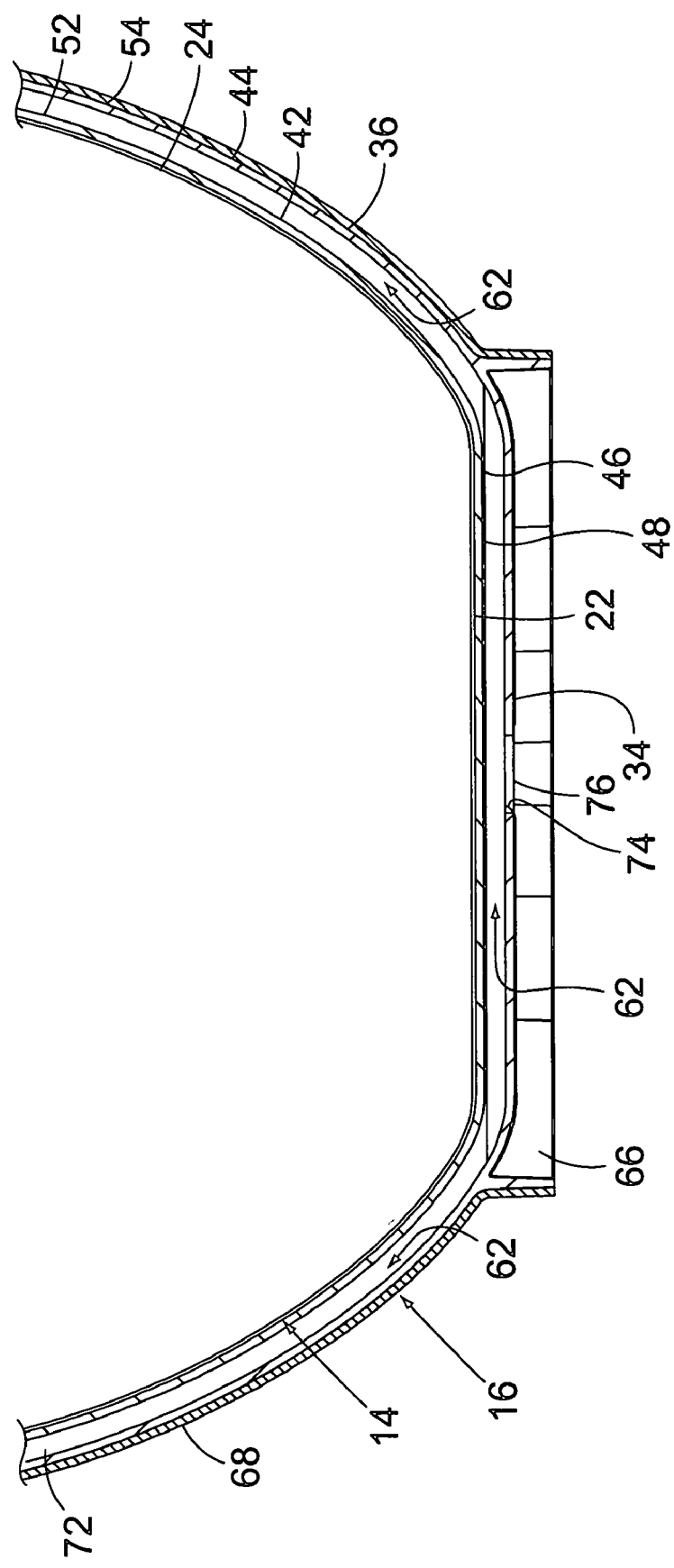
FIG. 5 is an enlarged, cross sectioned, partial view of the component parts of the vessel shown in FIG. 4; and, FIG. 6 is an enlarged, cross sectioned, partial view of the component parts of the vessel shown in FIG. 4.

The outer container interior layer 42 has a configuration that matches the configuration of the inner container 14. As shown in FIG. 4, when the interior container 14 is nested inside the outer container 16, a significant portion of the exterior surface of the inner container 14 is in contact with the outer container 16. The exterior surface of the inner container bottom wall 22 engages in surface contact with the bottom wall 46 of the outer container interior layer 42. The exterior surface of the inner container side wall 24 engages in surface contact with the side wall 52 of the outer container interior layer 42. Only a small portion of the inner container side wall 24 projects above the outer container side wall 36, spacing the top edge 26 of the inner container above the top edge 38 of the outer container. This is best seen in the detail of FIG. 6.

To further enhance the surface engagement between the inner container 14 and outer container 16 when the inner container is nested in the outer container, a locking mechanism is provided between the two containers. A plurality of L-shaped recessed slots 64 are provided in the outer container interior layer 42. The recessed slots 64 are spatially arranged around the outer container interior layer 42 adjacent the top edge 56 of the layer. Each of the recessed slots 64 is dimensioned to receive one of the projections 28 on the inner container side wall 24.

As the inner container 14 is inserted into the outer container 16, the projections 28 are aligned with the slots 64 and passed downwardly into the slots as the inner container 14 is nested in surface contact inside the outer container 16. The inner container 14 is then rotated slightly relative to the outer container 16, causing the inner container projections 28 to move through the horizontally oriented portions of the recessed slots 64 shown in FIG. 3. This removably locks the inner container 14 inside the outer container 16. In addition, the engagement of the projections 28 in the slots 64 insures that the exterior surface of the inner container 14 is in close surface contact with the outer container interior layer 42 across a substantial portion of the interior container exterior surface.

To remove the inner container 14 from the outer container, the inner container is rotated in the opposite direction relative to the outer container 16, and the inner container 14 is lifted out of the outer container 16.

An elevating apron 66 is provided on the exterior surface of the outer container exterior layer 44. The apron 66 elevates the outer container 16 above a separate surface on which the container is supported. This also elevates the bottom wall 48 of the outer container exterior layer 44 above the supporting surface, preventing any heat transfer directly from the exterior layer bottom wall 48 to the supporting surface. An insulating coating or covering 68 extends over much of the exterior surface of the outer container 16.

A phase change material 72 fills the hollow chamber 62 of the outer container 16. One or more access holes 74 with mating sealing plugs 76 could be provided on the outer container exterior layer 44 to enable injecting the phase change material 72 into the hollow chamber 62. Various different types of phase change material 72 known in the prior art may be employed in the hollow chamber 62. The phase change material 72, when chilled, maintains its cold temperature for an extended period of time, and the phase change material 72, when heated, maintains its heated temperature for an extended period of time. In the preferred embodiment, the phase change material 72 is a gel that facilitates the injection of the material into the hollow chamber 62. Due to the substantial surface contact between the exterior surface of the inner container 14 and the interior layer 42 of the outer container 16, the temperature of the phase change material 72 is transferred to a food or beverage contained in the inner container 14, thereby maintaining the food or beverage at its desired temperature for an increased period of time. The hollow chamber 62 extending upwardly through the interior of the outer container side wall 36 also enables the temperature of the phase change material 72 to be transferred through the outer container side wall 36 to the food or beverage contained in the inner container 16.

The lid 18 in the illustrated embodiment has a circular configuration with a peripheral rim 78 that extends downwardly from the outer peripheral edge of the lid. In the preferred embodiment, the lid 18 is constructed of a resilient material. The resilience of the lid enables the peripheral rim 78 to be flexed outwardly to snap fit the rim over the rounded top edge 26 of the inner container 14. In the preferred embodiment, the lid 18 is molded of a resilient plastic. A hinge 82 is provided on the lid. The hinge 82 extends in a straight line across the lid 18, and could be a knuckle hinge or a living hinge molded into the lid. The hinge 82 enables the smaller section 84 of the lid on one side of the hinge line to be separated from the inner container top edge 26 and hinged upwardly, thereby providing access to the interior of the inner container 14.

A temperature indicator 86 is mounted in the outer container exterior layer 44. Any type of known temperature indicator could be used. The temperature indicator communicates with the phase change material 72 in the outer container chamber 62 and provides a visual indication of the temperature of the phase change material.

The construction of the food and beverage storage and serving vessel 12 of the invention described above provides a source of cooling or heating in the vessel bottom wall and side wall, thereby providing cooling or heating to a greater amount of the food or beverage contained in the vessel than was provided by prior art vessels.

The removable inner container of the vessel can be removed from the outer container for easy cleaning and restocking of the inner container. Several different inner containers could be provided for use with one outer container, enabling frequent replacement of restocked inner containers in the single outer container.

Although the food and beverage storage and serving vessel of the invention has been described above by reference to a single embodiment, it should be understood that modifications and variations could be made to the vessel without departing from the scope of the invention defined by the following claims.

The invention claimed is:

1. A food and beverage, storage and serving vessel comprising:
   an inner container having an inner container bottom wall and an inner container side wall that surrounds and extends upwardly from the inner container bottom wall to a top edge of the inner container side wall; and
   an outer container formed from an interior layer of material suspended above an exterior layer of material, the outer container having an outer container bottom wall and an outer container side wall that surrounds an extends upwardly from the outer container bottom wall to a top edge of the outer container side wall, wherein a top edge of the interior layer of material is secured to a top edge of the exterior layer of material, the outer container being dimensioned to receive the inner container nested inside the outer container with the outer container bottom wall engaging with a majority of the inner container bottom wall and with the outer container side wall engaging with a majority of the inner container side wall; an exterior surface of the exterior layer of material provides an elevating apron to elevate the vessel above a supporting surface; and a locking assembly between the inner container and the outer container is positioned on the outer container side wall and the inner container side wall that removably attaches the inner container to the outer container;
   a hollow chamber inside the outer container bottom wall and a hollow chamber inside the outer container side wall; and,
   a phase change material in the outer container bottom wall chamber and a phase change material in the outer container side wall chamber.

2. The vessel of claim 1, further comprising:
   the outer container bottom wall chamber and the outer container side wall chamber are connected together as one continuous chamber.

3. The vessel of claim 1, further comprising:
   the outer container side wall having a height dimension between the outer container bottom wall and the top edge of the outer container side wall; and
   the chamber inside the outer container side wall extends upwardly through the outer container side wall for a majority of the height dimension of the outer container side wall.

4. The vessel of claim 1, further comprising:
   the inner container bottom wall and side wall being a single continuous material.

5. The vessel of claim 1, further comprising:
   the inner container bottom wall and side wall being a single continuous piece of metal.

6. The vessel of claim 1, further comprising:
the locking assembly positioned on the outer container side wall and the inner container side wall adjacent to the top edges of outer container side wall and the inner container side wall.

7. The vessel of claim 6, further comprising:
the locking assembly including a plurality of projections on one of the inner container and outer container and a plurality of recessed slots on the other of the inner container and outer container, the plurality of slots being dimensioned to receive the plurality of projections to removably attach the inner container to the outer container.

8. The vessel of claim 1, further comprising:
a layer of insulating material on the exterior surface of the outer container, the layer of insulating material being positioned on an opposite side of the outer container bottom wall and the outer container side wall from the inner container.

9. The vessel of claim 1, further comprising:
the inner container side wall top edge being spaced above the outer container side wall top edge with the inner container nested inside the outer container.

10. The vessel of claim 9, further comprising:
a lid having a peripheral rim that is dimensioned to resiliently fit over the inner container top edge in removably attaching the lid to the inner container.

11. The vessel of claim 1, further comprising:
a temperature indicator on the outer container providing a visual indication of a temperature of the phase change material.

12. A food and beverage, storage and serving vessel comprising:
an inner container formed from a single layer of material with a bottom wall and a side wall that surrounds the bottom wall and extends upwardly from the bottom wall to a top edge of the inner container side wall;
an outer container formed from an interior layer of material suspended above an exterior layer of material, the interior and exterior layers together form the outer container with a bottom wall and a side wall surrounding and extending upwardly from the bottom wall to top edges of the interior and exterior layers that come together at a top edge of the outer container side wall, wherein the top edge of the interior layer is secured to the top edge of the exterior layer, the interior layer being dimensioned to receive the inner container nested inside the interior layer with a majority of the inner container being in surface contact with the interior layer, and the interior and exterior layers being dimensioned to form a hollow chamber between the interior and exterior layers in the outer container bottom wall and the outer container side wall; an exterior surface of the exterior layer of material provides an elevating apron to elevate the vessel above a supporting surface, and,
a phase change material in the hollow chamber.

13. The vessel of claim 12, further comprising:
the phase change material extending continuously through the hollow chamber in the outer container bottom wall and the outer container side wall.

14. The vessel of claim 12, further comprising:
the hollow chamber and phase change material extend upwardly through the outer container side wall to adjacent the top edges of the interior and exterior layers of material.

15. The vessel of claim 12, further comprising:
a locking assembly between the inner container and the interior layer of the outer container that removably attaches the inner container to the outer container with the inner container in surface contact with the interior layer of the outer container.

16. The vessel of claim 15, further comprising:
the locking assembly including a plurality of projections on one of the inner container and interior layer of the outer container, and a plurality of slots on the other side of the inner container and the interior layer of the outer container, the plurality of slots being dimensioned to receive the plurality of projections to removably attach the inner container to the interior layer of the outer container.

17. The vessel of claim 12, further comprising:
a coating of an insulating material on a side of the exterior layer of the outer container that is opposite the interior layer.

18. The vessel of claim 12, further comprising:
the inner container top edge being spaced above the top edges of the outer container interior and exterior layers with the inner container nested inside the interior layer of the outer container.

19. The vessel of claim 18, further comprising:
a lid constructed of a resilient material and having a resilient peripheral rim that is dimensioned to resiliently fit over the inner container top edge.

20. The vessel of claim 12, further comprising:
a temperature indicator of the exterior layer of the outer container and communicating with the phase change material in the hollow chamber to provide a visual indicator of a temperature of the phase change material.

21. A food and beverage, storage and serving vessel comprising:
an inner container formed from a single layer of material with a bottom wall and a side wall that surrounds the bottom wall and extends upwardly from the bottom wall to a top edge of the inner container side wall;
an outer container formed from an interior layer of material suspended above an exterior layer of material, the interior and exterior layers together form the outer container with a bottom wall and a side wall surrounding and extending upwardly from the bottom wall to top edges of the interior and exterior layers that come together at a top edge of the outer container side wall, wherein the top edge of the interior layer is secured to the top edge of the exterior layer, the interior layer being dimensioned to receive the inner container nested inside the interior layer with a majority of the inner container being in surface contact with the interior layer, and the interior and exterior layers being dimensioned to form a hollow chamber between the interior and exterior layers in the outer container bottom wall and the outer container side wall;
a locking assembly between the inner container and the outer container positioned on the outer container side wall and the inner container side wall that removably attaches the inner container to the outer container; and
a phase change material in the hollow chamber.

\* \* \* \* \*